United States Patent

Asano et al.

Patent Number: 5,848,389
Date of Patent: Dec. 8, 1998

[54] SPEECH RECOGNIZING METHOD AND APPARATUS, AND SPEECH TRANSLATING SYSTEM

[75] Inventors: Yasuharu Asano, Kanagawa; Hiroaki Ogawa, Tokyo; Yasuhiko Kato, Kanagawa; Tetsuya Kagami, Chiba; Masao Watari, Ibaragi; Makoto Akabane, Tokyo; Kazuo Ishii, Kanagawa; Miyuki Tanaka, Tokyo; Hiroshi Kakuda, Kanagawa, all of Japan

[73] Assignee: Sony Corporation, Tokyo, Japan

[21] Appl. No.: 626,132

[22] Filed: Apr. 5, 1996

[30] Foreign Application Priority Data

Apr. 7, 1995  [JP]  Japan ................................ 7-082218

[51] Int. Cl.$^6$ ............................................. G10L 5/02
[52] U.S. Cl. ........................ 704/239; 704/251; 704/277
[58] Field of Search ............................. 395/2.48, 2.86, 395/2.4, 2.49, 2.6, 2.61, 2.64; 704/239, 277, 243, 231, 240, 251, 252, 255, 2, 4, 7, 9

[56] References Cited

U.S. PATENT DOCUMENTS

| | | | |
|---|---|---|---|
| 5,369,727 | 11/1994 | Nomura et al. ........................ | 395/2.48 |
| 5,384,701 | 1/1995 | Stentiford et al. ...................... | 395/2.86 |
| 5,457,768 | 10/1995 | Tsuboi et al. ............................. | 395/2.4 |
| 5,615,301 | 3/1997 | Rivers .................................... | 395/2.86 |

OTHER PUBLICATIONS

H. Tanaka et al., "Explus–A Semantic Parsing System for Japanese Sentences," 3rd USA–Japan Computer Conference Oct. 1978, Session 13–2–1, pp. 236–240.

K. Fukunaga et al., "Recognition of Words with Semantic Information," Electronics and Communications in Japan, vol. 59–A, No. 1, Jan. 1996, pp. 12–19.

F. W. M. Stentiford et al., "A Speech Driven Language Translation System," European Conference on Speech Technology, vol. 2, Sep. 1987, Edinburgh, pp. 418–421.

T. Morimoto et al., "Integration of Speech Recognition and Language Processing in a Japanese to English Spoken Language Translation System," IEICE Transactions, vol. E74, No. 7, Jul. 1991, pp. 1889–1896.

H. Niemann et al., "Representation of a Continuous Speech Understanding and Dialog System in a Homogenous Semantic Net Architecture," ICASSP Apr. 1986, vol. 3, pp. 1581–1584.

Primary Examiner—Richemond Dorvil
Attorney, Agent, or Firm—Limbach & Limbach L.L.P.

[57] ABSTRACT

In a speech recognizing apparatus, a grammatical qualification of a proposed speech recognition result candidate is judged without using a grammatical rule. The speech recognizing apparatus for performing sentence/speech recognition is comprised of an analyzing unit for acoustically analyzing speech inputted therein to extract a feature parameter of the inputted speech; a recognizing unit for recognizing the inputted speech based upon the feature parameter outputted from said analyzing unit to thereby a plurality of proposed recognition result candidates; an example data base for storing therein a plurality of examples; and an example retrieving unit for calculating a resemblance degree between each of said plurality of proposed recognition result candidates and each of the plural examples stored in the example data base and for obtaining the speech recognition result based on said calculated resemblance degree.

13 Claims, 10 Drawing Sheets

FIG. 8

EXAMPLE OF WORD BIGRAM

| PRECEDING WORD | SUCCEEDING WORD | PROBABILITY |
|---|---|---|
| Kikai (Machine) | Sangyou (industry) | 0.00943 |
| | Ka (kikai-ka mechanization) | 0.00832 |
| | Hon-yaku (translation) | 0.00368 |
| | Bunmei (civilization) | 0.00012 |
| | ⋮ | ⋮ |
| Hon-yaku (translation) | Shori (process) | 0.01278 |
| | Seido (accuracy) | 0.00748 |
| | Ka (Hon-yaku ka → Translator) | 0.00328 |
| | ⋮ | ⋮ |

FIG. 11A

Watashi  wa  Tera  ni  Iku
I  go to  the temple

FIG. 11B

Watashi  wa  Tera  ni  Iku

Watashi  Gakkou  Iku

FIG. 11C

Watashi  wa  Gakkou  ni  Iku
I  go to  the temple

FIG. 11D

Watasi ⟷ I
Gakkou ⟷ school
Iku ⟷ go to

FIG. 11E

I  go to  the temple
↓  ↓  ↓
I  go to  school

SPEECH RECOGNIZING METHOD AND APPARATUS, AND SPEECH TRANSLATING SYSTEM

BACKGROUND OF THE INVENTION

The present invention relates to a speech recognizing apparatus, a speech recognizing method, and a speech translating system, suitably used in such a case that, for instance, speech is recognized, and the language of this speech recognition result is translated into another language.

FIG. 1 schematically represents one example of a conventional speech recognizing apparatus for recognizing sentence-based/speech (conversation speech recognition, or speech understanding). A speech input unit 1 is constructed of, for instance, a microphone for converting voice,—i.e., air waves—into voice (speech) signals that are electrical waves, and an amplifier for amplifying the speech signals outputted from this microphone. An A/D converting circuit 2 samples the analog speech signal outputted from the speech input unit 1 at a preselected clock timing to perform a quantizing process, so that the analog speech signal is converted into a digital speech signal (digital data).

An analyzing unit 3 acoustically analyzes the digital speech signal outputted from the A/D converting unit 2 so as to extract speech feature parameters: for example, speech power in specific ranges, line predictive coefficients (LPC), and Cepstrum coefficient. In other words, the analyzing unit 3 performs filtering of the speech signals with respect to preselected ranges by way of a filter bank. Then, analyzing unit 3 rectifies and smooths the filtered speech signals in order to calculate speech power for the respective ranges. Alternatively, analyzing unit 3 may execute, for example, a linear predictive analyzing process on a inputted speech so as to obtain the linear predictive coefficient. Also, analyzing unit 3 may process this linear predictive coefficient to obtain a Cepstrum coefficient.

The feature parameters obtained in the analyzing unit 3 are directly outputted to the recognizing unit 50, or are vector-quantized therein, and then the vector-quantized feature parameters are outputted to the recognizing unit 50.

The recognizing unit 50 performs speech recognition based upon the feature parameters (or, symbols obtained by vector-quantizing feature parameters) obtained from the analyzing unit 3 in accordance with a speech recognition algorithm such as the dynamic programming (DP) matching method and the hidden Markoff model (HMM). In this case, when speech recognition is carried out for phoneme units in the recognizing unit 50, proposed phonemic candidate obtained as a proposed candidate, for the speech recognition result, is outputted in, for example, a lattice data form into the parser unit 51 (below, a "proposed phonemic subject lattice").

The parser unit 51, first refers to the word dictionary 52 into which the index of word (or nor phene) headings (for example, if the word is "read out", then the heading would be "read out"), the phonemic information thereof (reading), the parts of speech, and other necessary information have been registered. Then, the parser unit 51 combines the proposed phonemic candidates contained in the proposed phonemic subject lattice supplied from the recognizing unit 50 to form more than one word, and thereafter combines more than one word to form a word series (sentence). Then, the parser unit 51 applies the grammatical rules registered in the grammatical rule dictionary 53 to this word series based on a preselected parsing algorithm. The parser unit 51 repeatedly applies the grammatical rule to such word series formable from the proposed phonemic lattice derived from the recognizing unit 50, so that the word series most suitable to the grammatical rules—namely a sentence—is outputted as a sentence/speech recognition result (otherwise, speech understanding result). It should be noted that the grammatical rules are formed by, for instance, experts in the speech recognition field.

In the speech recognizing apparatus with the above-described arrangement, when speech is inputted into the speech input unit 1, this speech is outputted as a speech signal via the A/D converting unit 2 to the analyzing unit 3. In the analyzing unit 3, the speech signal is acoustically analyzed to thereby extract a speech feature parameter from the speech signal. The speech feature parameter is supplied to the recognizing unit 50. In this recognizing unit 50, speech recognition is carried out in phoneme units by employing the speech feature, and the resultant proposed phonemic candidate lattice is outputted to the parser unit 51. The parser unit 51 refers to the word dictionary 52 and the grammatical rule dictionary 53, so that the word series obtained from the proposed phonemic subject lattice supplied from the recognizing unit 50 can be speech-recognized (speech understood) to output the speech recognition result.

On the other hand, as the purging algorithm used to execute the sentence/speech recognition in the parser unit 51, the following methods are known: namely, the method for analyzing the sentence/speech based upon, e.g., context-free grammar in a parallel manner while leaving the unanalyzed results (the parser for performing the parsing operation by such a method is called a "chart parser"), and also the method for previously calculating the information required for the analysis from context-free grammar to automatically produce a table referred to as an "LR analysis table", and for executing the analysis with reference to this LR analysis table (the parser for performing the purging operation by such a method is called an "expanded LR parser").

Now, the "LR" of the above-described LR parser has the following meaning: that is, the symbol "L" of "LR" is abbreviated from the expression "Left-to-right" which implies that a sentence is scanned from the left direction to the right direction. The other symbol, "R", is abbreviated from an expression "Rightmost derivation", which implies that a rule is applied to the rightmost non-end symbol in a rewriting rule of the context-free grammar. It should also be noted that there is another type of parser, which is called as an "LL parser". This LL parser scans a sentence from the left direction to the right direction, and executes the leftmost derivation, which is opposite to the above-described rightmost derivation.

On the other hand, several improved methods have been proposed in, for instance, "Continuous Speech Recognition by using HMM Phonemic Recognition and Expanded LR Structural Analyzing Method" written by Kita et al., Transactions of the Institute of Information Processing, Vol. 31, No. 3 pages 472 to 480 in 1990, and also "Continuous Speech Recognition by using the Expanded LR Structural Analyzing Method" written by Ito et al., Electronic Information Communication Institute Report, SP 90-74. That is, these methods have been proposed such that in the parser unit, the expanded LR parser predicts what phonemic series will occur, and the recognizing unit performs phonemic identification with respect to the predicted phoneme using HMM. According to this method, it is possible to reduce the number of calculations during the recognition process.

Furthermore, another method has been proposed in "Speech Language Processing by using Probability Grammar", written by Kita, Research Reports of Artificial Intelligence Institute, SIG-SLUD-9204-6. This is a method whereby information concerning the rate at which a grammatical rule is applied in the expanded LR parser is considered when selecting the appropriate grammatical rule. In other words, with this method, first, when context-free grammar is used as the grammatical rule, a large number of scholarly texts were consulted to discover the rate at which generative rules were applied. When this context-free grammar is then displayed in an LR analysis table, this rate data is also shown in the LR analysis table. During analysis with the expanded LR parser, occurrence-rate calculations are performed. As a result, for language expressions that occur frequently, a high rate value is obtained, while for non-text (grammatically incorrect text) an extremely small rate value is obtained. With this method, the number of calculations can thus be even further reduced.

On the other hand, in contrast to the above-explained method, other methods have been proposed in which a plurality of hypotheses are first obtained by employing such information whose calculation load is small, and then these hypotheses are pared down by selecting the higher graded information, namely the language restrictions are subdivided into two stages. These different methods are described in, for instance, "A Tree-Trellis Based Fast Search for Finding the N Best Sentence Hypotheses in Continuous Speech Recognition", F. K. Soong and et al., Proceedings of Speech an Natural Language Workshop, DARPA, pp.12–19, (1990), "The N-best algorithm: An efficient and exact procedure for finding the N most likely sentence hypotheses", R. Schwartz and et. al., Proceeding of ICASSP 90, pp. 81–84 (1990).

In this method, when the recognition process is first carried out in the recognizing unit by using the analysis results obtained by the analyzing unit—for example, the HMM a loose language restriction is made by employing the statistical language model and a finite state network such as a bigram or a trigram. The bigram and the trigram correspond to, for example, the primary Markoff model and the secondary Markoff model, in which the chaining probability for phonemes, phrases, words etc. is studied based upon a large amount of text database. These bigrams and trigrams are known as models such that the local character of the natural language can be approximated with higher precision.

Then, under such restrictions, the parsing processing operation is properly carried out by way of, for instance, the known beam search using the Viterbi algorithm. Accordingly, a plurality of proposed sentence candidates remaining after the parsing processing operation are outputted. Thereafter, the more precise grammatical rules are applied to these plural proposed sentence candidates in order to execute sentence/speech recognition (speech understanding).

The above-explained conventional methods, the grammatical rules employed in the parser unit are formed by experts in order to comprehend the various sentence formats spoken by humans. However, it is very difficult to describe these rules in a proper manner to enable correct sentence/speech recognition. In other words, when the grammatical rules are made unnecessarily strict, all statements which cannot satisfy these rules are not recognized. Conversely, when the grammatical rules are made unnecessarily loose, sentence which do not make grammatic sense (grammatically incorrect sentences) would be considered as recognition results.

As consequence, generally speaking, sentence examples which are not properly parsed, are searched and then the grammatical rule is changed based on this sentence example. However, in general, there is no clear solution as to how to correct grammatical rules effectively. Also, it is difficult to predict how the recognition processing operation will be changed when a grammatical rule is changed. Accordingly, there is a risk that an erroneous process will be preformed to sentences after a grammatical rule is changed, although they may have been properly processed before the change of this grammatical rule. Corrections of the grammatical rule cannot be easily performed.

OBJECT AND SUMMARY OF THE INVENTION

The present invention has been made in an attempt to solve the above-described problems, and therefore, its object is to provide a speech recognizing method/apparatus and also a speech translating apparatus that are capable of judging grammatical qualifications of proposed subjects for speech recognition results without employing grammatical rules, resulting in sentence/speech recognition (speech understanding) being effected to higher precision.

The speech recognizing apparatus of the present invention is comprised of an example means for storing multiple examples and a calculation means for calculating a resemblance degree between each of a plurality of recognition result candidates and each of the examples stored within the example memory means, and for obtaining a speech recognition result based on the calculated resemblance degree.

The speech recognizing method of the present invention is comprised of an example memory means for storing multiple examples. It is a speech recognizing method for a speech recognizing apparatus that performs written/speech recognition, that calculates the resemblance degree between each of a plurality of recognition result candidates and each of the examples stored within the example means, and that obtains a speech recognition result based on the calculated resemblance degree.

The speech translating apparatus of the present invention is comprised of an example means for storing multiple examples, a calculation means for calculating a resemblance degree between each of a plurality of recognition result candidates and each of the examples stored within the example memory means, and for obtaining a speech recognition result based on the calculated resemblance degree, and a translation means for translating the language of the speech recognition results outputted by the calculating means into another language.

BRIEF DESCRIPTION OF THE DRAWINGS

FIG. 8 shows an example (word bigram) of a language model applied to the present invention;

FIG. 11A to FIG. 11E are explanatory diagrams for explaining operations of the speech translating apparatus shown in FIG. 8.

DESCRIPTION OF THE PREFERRED EMBODIMENTS

Figure 1:
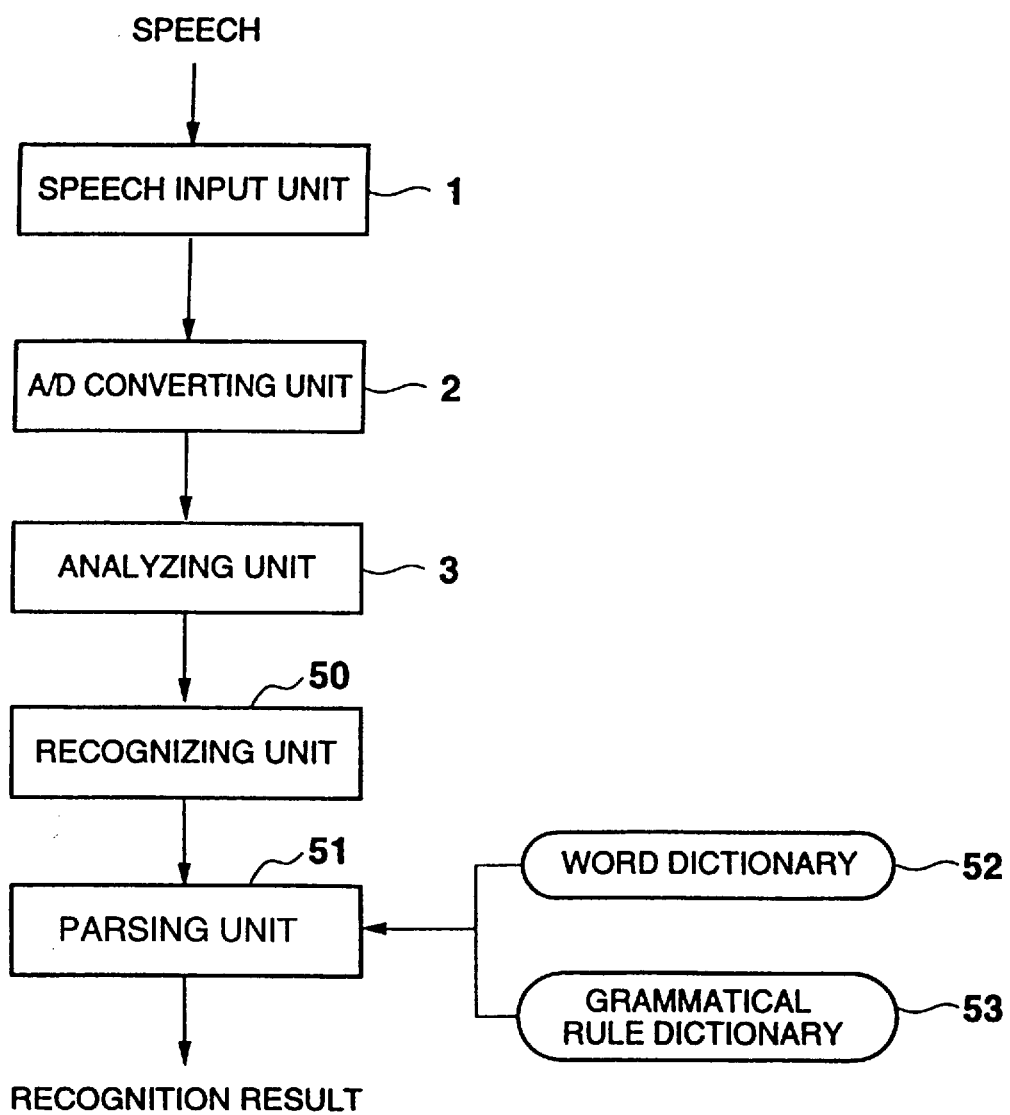
FIG. 1 is a schematic block diagram indicating one example of an arrangement of a conventional speech recognizing apparatus.
Figure 2:
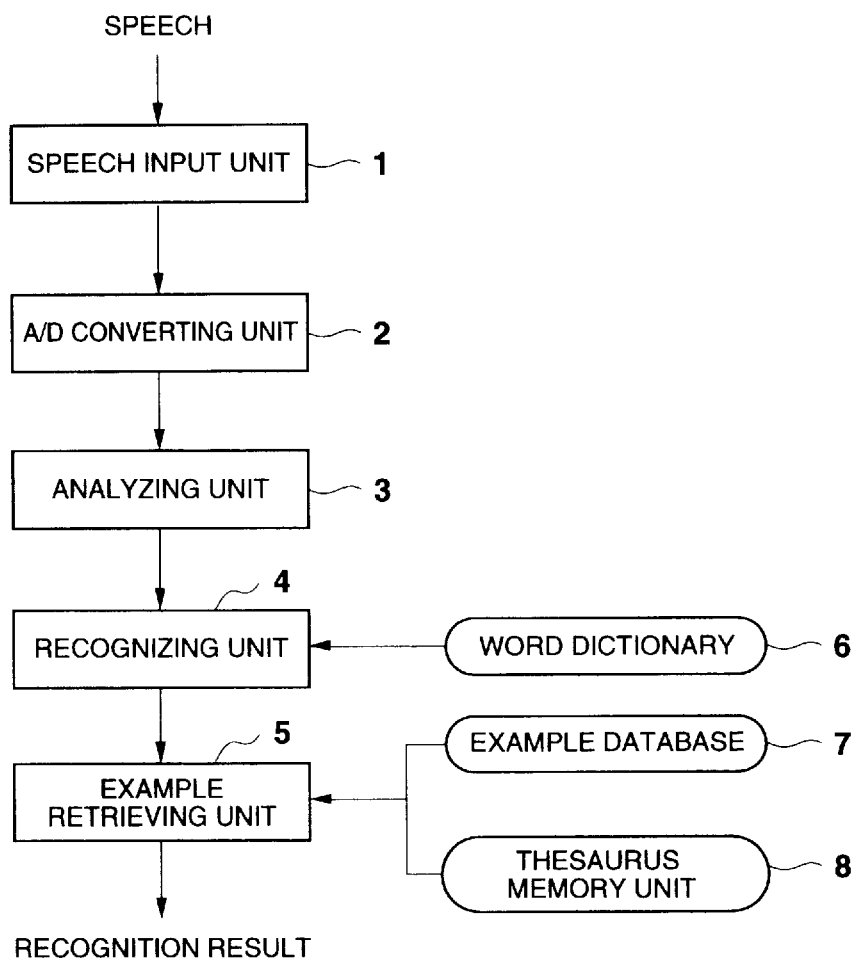
FIG. 2 is a schematic block diagram showing an arrangement of a speech recognizing apparatus according to a first embodiment of the present invention.

FIG. 2 schematically represents an arrangement of a speech recognizing apparatus according to a first embodiment of the present invention. It should be noted that the same reference numerals shown in FIG. 1 will be employed for denoting the same or similar circuit elements, and explanations thereof are omitted.

Similar to the recognizing unit 50 of FIG. 1, a recognizing unit 4 (recognizing means) performs speech recognition by using a feature parameter (otherwise, a symbol produced by vector-quantizing this feature parameter) derived from an analyzing unit 3 in accordance with a predetermined speech recognition algorithm. It should also be noted that although the conventional recognizing unit 50 executed speech recognition by phoneme unit, this recognizing unit 4 performs speech recognition by word units with reference to, for example, a word dictionary 6 (to be discussed below). Then, in the recognizing unit 4, a proposed subject of the word (proposed word subject), obtained from the speech recognition result in word units, is outputted as a proposed subject for the speech recognition result in the form of, e.g., a lattice (the proposed word subject outputted in this lattice form will be referred to as a "proposed word subject lattice" hereinafter).

An example retrieving unit 5 (calculating means) combines together the proposed word subjects, contained in the proposed word subject lattice derived from the recognition unit 4, to thereby form a plurality of word columns (sentences) constructed of at least one word. Then, example retrieving unit 5 calculates a resemblance degree between each of the plurality of word columns (sentences) and each of the examples stored in an example database 7 (to be explained below). The example retrieving unit 5 may determine the recognition result (sentence) of the speech entered into the speech input unit 1 based upon the calculated resemblance degree.

It should be understood that the calculation of the resemblance degree in the example retrieving unit 5 is carried out by utilizing a thesaurus stored in the thesaurus memory unit 8. Also, the process operation for forming a plurality of word columns (sentences) made of at least one word, by combining the proposed word subjects contained in the proposed word subject lattice with each other, may be carried out not by the example retrieving unit 5, but by the recognizing unit 4.

Within the word dictionary 6 (word memory means), there are stored an index of words, phonemic information thereof (reading), further parts of speech as well as other information, if required, corresponding thereto. In the recognizing unit 4, speech recognition is carried out as to the words stored in this word dictionary 6.

In the example database 7 (example memory means), a plurality of examples are stored or registered. The examples are formed based upon, for example, sentences described in newspapers, and sentences described in originals read by an announcer.

Figure 5:
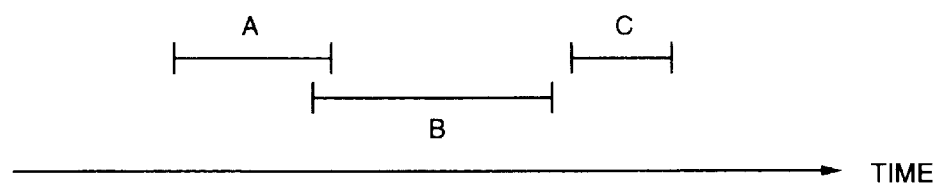
FIG. 5 is an explanatory diagram used to explain a process operation defined at step S1 of the flow chart of FIG. 3.

A thesaurus memory unit 8 (word concept memory means) stores therein at least the words registered in the word dictionary 6, while categorizing these words by concept. In this embodiment, as shown in FIG. 5, a thesaurus, wherein words are formed in a hierarchial tree structure based upon the concept thereof, is stored in the thesaurus memory unit 8.

In speech recognizing apparatus with the above—described arrangement, the speech entered into the speech input unit 1 is processed by an A/D converting unit 2 and further by an analyzing unit 3 (extracting means) to thereby be converted into a feature parameter (otherwise, symbol) which will then be outputted to the recognizing unit 4. In the recognizing unit 4, speech recognition, by word units, is carried out in accordance with, for instance, HMM, by employing the output from the analyzing unit 3.

Now, a simple explanation of HMM will be described. HMM is defined as a non-decisive finite condition automaton. This model is constituted by several conditions and paths indicative of transitions among these conditions. In such a model, a state transition process from each respective state is the Markoff's process. When a state is transited, a single symbol is outputted and a model of learning is carried out. Assuming that there are N pieces of model states and K that sorts of symbols are outputted from the model, a large number of learning data are employed in this learning process to calculate the probability (state transition probability) "aij" of transition from a state "i" to a state "j", and the probability "bij(yk)" (output symbol probability) to output a symbol "yk" at this time. (Note that $0<i, j<N+1$, $0<k<k+1$.)

It should be noted that as a parameter of HMM, there is a probability (initial state probability) "πi" when it is at state "i" at the beginning. Normally, a left-to-right model is used such that a state is transited only to itself, or only to the right side in the speech recognition, so that the initial state is the leftmost state of the model (at first, the probability when the model is located under the leftmost state is selected to be 1, and the probability when the model is located under other states is selected to be 0). As a consequence, normally, there is no need to calculate the initial state probability in the learning process.

On the other hand, during speech recognition, a calculation is made of a probability (occurrence probability) such that the symbol series outputted from the analyzing unit 3 is monitored (occurs) by employing the state transition probability and the output symbol probability, which are obtained from the result of the learning process. The higher occurrence probability is recognized as the recognition result.

In this embodiment, for example, a model in phoneme units (phoneme model) which has been obtained by previously carrying out the learning process is stored in the recognizing unit 4. The recognizing unit 4 couples the phoneme models to each other with reference to the word phonemic information registered in the word dictionary 6, and thus produces a model of a word registered in the word dictionary 6. Then, as described above, the occurrence probability is calculated by employing this model, and a lattice constructed of the words whose probability is high is outputted as a proposed word subject lattice.

Alternatively, when rather than phoneme models, models in word units (namely, word models) are stored in the recognizing unit 4, it is possible to perform continuous speech recognition by directly using this model.

Figure 3:
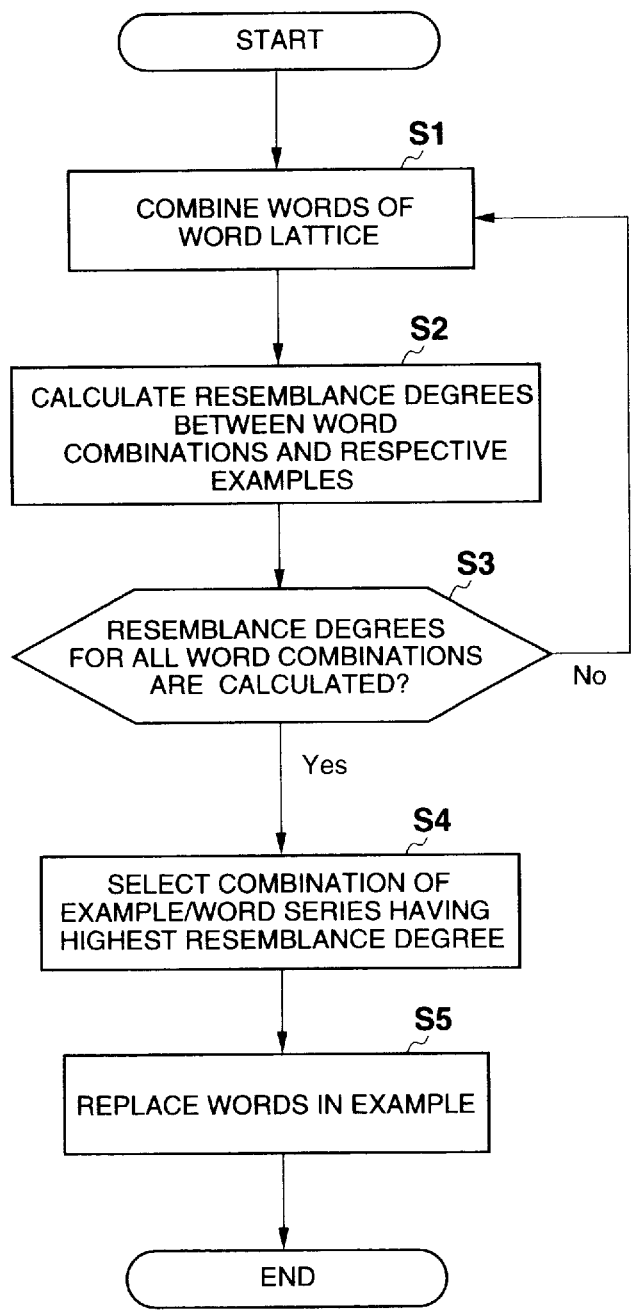
FIG. 3 is a flow chart for explaining operations of the example retrieving unit 5 shown in FIG. 2.

The proposed word subject lattice outputted from the recognizing unit 4 is supplied to the example retrieving unit 5. Upon receipt of the proposed word subject lattice, the example retrieving unit 5 performs a process operation in accordance with the flow chart of FIG. 3, for example. That is to say, first, at step S1, the words for constituting the word lattice are combined with each other, and then a word column or series (sentence) made of at least one word is formed. It should be noted that at this time, the words of the proposed word subject lattice do not overlap each other along the time based direction, and that they also are combined with each other in the time sequence.

Figure 4:
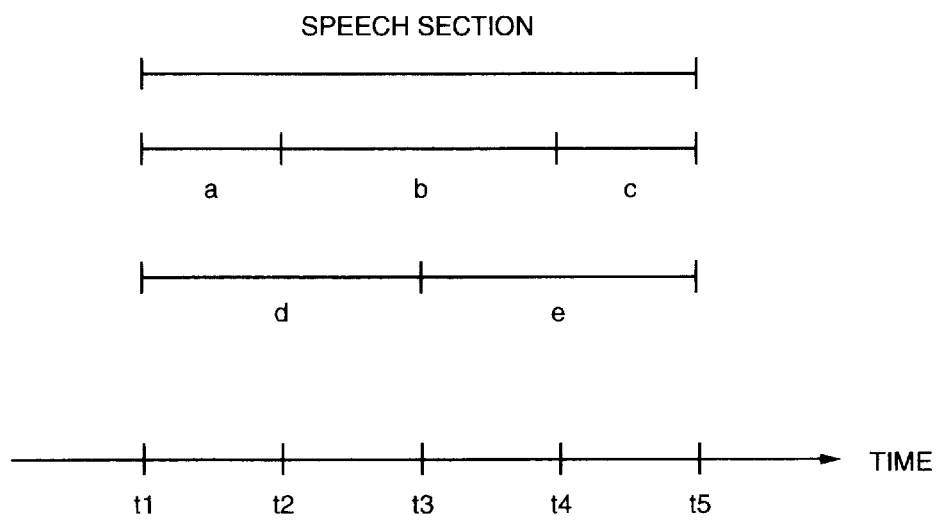
FIG. 4 is an explanatory diagram used to explain a process operation defined at step S1 of the flow chart of FIG. 3.

In other words, it is now assumed that, as shown in FIG. 4, a proposed word subject lattice whose speech section is defined from a time instant t1 to a time instant t5 is outputted from the recognizing unit 4. It should be understood that FIG. 4 represents such a situation that words "a", "b", "c", "d" and "e" could be recognized as the words having the highest occurrence probability in the speech sections defined from the time instant t1 to the time instant t2, from the time instant t2 to the time instant t4, from the time instant t4 to the time instant t5, from the time instant t1 to the time instant t3, and from the time instant t3 to the time instant t5.

In this case, there are four sets of word combinations in the time sequence, i.e., (a, b, c), (d, e), (a, e), and (d, c), which do not overlap each other along the time base direction.

At step S1, any one of the above-described combinations is formed.

Practically speaking, since an error may happen to occur in phonemic segmentation during speech recognition, as shown in FIG. 4, there is substantially no case where just after the speech section of a certain word, the speech section of another word is not located. Normally, as indicated in FIG. 4, even when the words A, B and C are continuously produced, the speech section of word A is overlapped with the speech section of word B from a temporal perspective, and the speech section of word B is separated from the speech section of word C from a temporal perspective. As a consequence, at step S1, although the word combinations do not overlap along the time based direction under the ideal condition, a small overlap in the speech sections is allowed unless it may be clearly recognized that different words are produced at the same time instant, and then word combinations are formed.

After the word combinations have been formed, the process operation is advanced to step S2. At step S2, a calculation is made between a resemblance degree of this word combination and a resemblance degree of the example registered in the example database 7. In accordance with this preferred embodiment, as the method for calculating this resemblance degree, such a method is applied which is disclosed in, for example, Japanese Laid-open Patent Application No. 3-276367 opened on Dec. 6, 1991, and in which the thesaurus is made by words in a tree hierarchical structure based upon the resemblance (concept) of the words, meanings. That is, in the case where such a conceptional hierarchy corresponds to a k-th hierarchy, where both a certain word for constituting a combination of words, and a word for constituting the example corresponding to this word belong to the same category, assuming now that a word resemblance degree indicative of a conceptional resemblance between these words is (k−1)/n (note that symbol "in" is the hierarchical number of the thesaurus), word resemblance degrees as to the respective words constituting the word combinations, and the respective words constructing the example, are calculated. Then, the calculated results are used as the resemblance degrees between the word combinations and the example.

Figure 6:
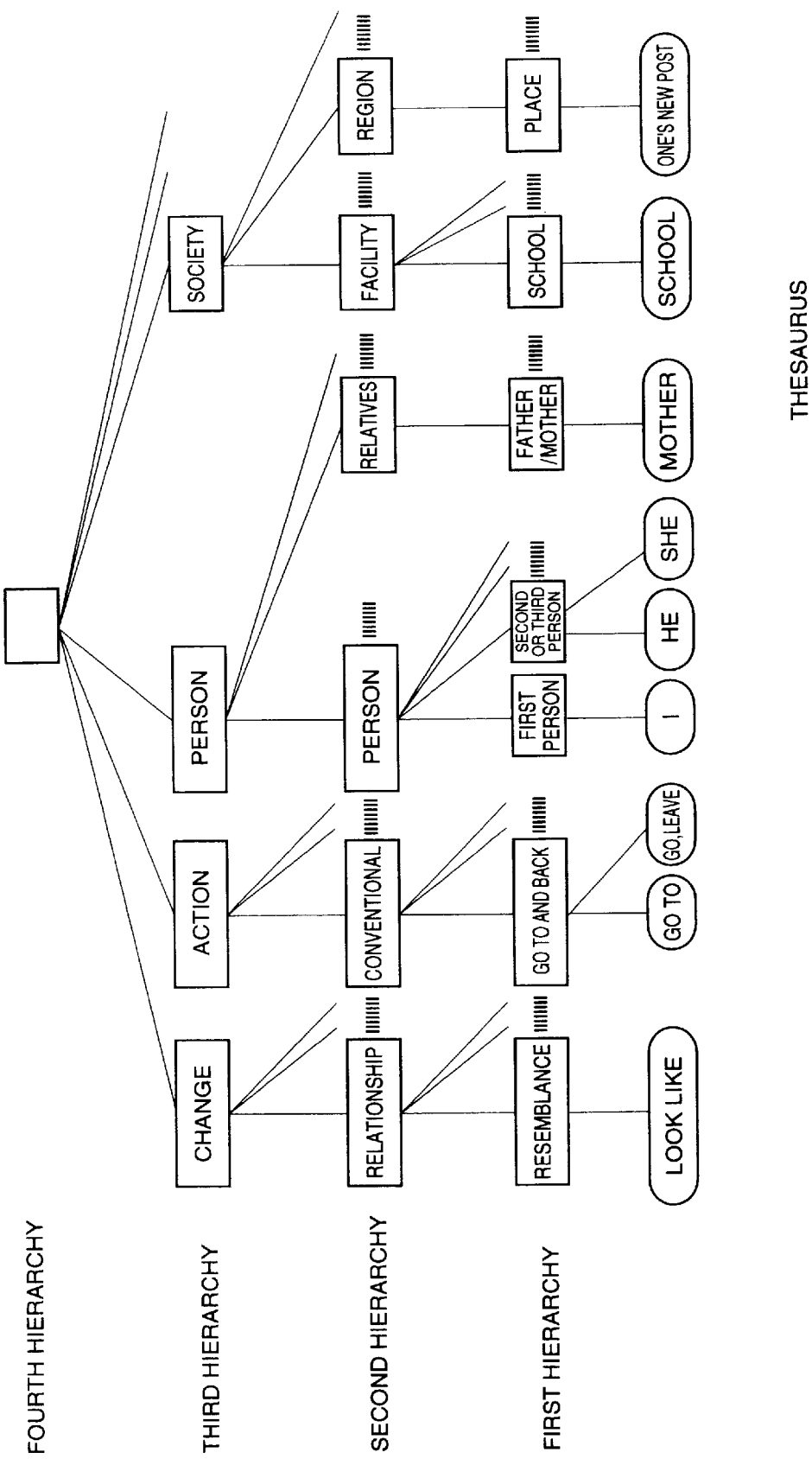
FIG. 6 is an illustration showing the thesaurus stored in the thesaurus memory unit 8 of FIG. 2.

Concretely speaking, assuming now that such a thesaurus as represented in FIG. 6 is stored in the thesaurus memory unit 8, resemblance degrees will be calculated as follows:

Note that in FIG. 6, an item surrounded by a rectangular box denotes a concept, whereas an item surrounded by an elliptical box denotes a word. In this drawing, the concept belonging to the uppermost hierarchy (fourth hierarchy) "Hendou (change)", "Koudou (action)", "Jinbutsu (person)", and "Shakai (society)", is classified along with other concepts. For instance, the concept "Jinbutsu (person, character)" among these uppermost concepts is classified together with the concepts "Ninshou (person)" and "Shinzoku (relatives)" which are contained therein, as well as with others. Furthermore, the concept "Ninshou (person)" is classified with "Jishou (the first person)" and "Tashou (the second or third person)" and others. To the concept "Tashou (the second or third person)" among these, the words "Kare (he)" and "Kanojo (she)" are categorized thereto, as well as others that pertain.

In FIG. 6, the lowermost conceptional hierarchy is defined as a first hierarchy, the second conceptional hierarchy from the bottom is defined as a second hierarchy, the third conceptional hierarchy from the bottom is defined as a third hierarchy, and the uppermost conceptional hierarchy is defined as a fourth hierarchy. Since the thesaurus of FIG. 6 is constructed of four hierarchical layers, the word resemblance degree of the words whose concepts are coincident with each other, by returning back to the first hierarchy of the thesaurus, are equal to 0 (=(1-1)/4). Also, the resemblance degree of the words whose concepts are coincident with each other, by returning back to the second hierarchy of the thesaurus, is equal to ¼ (=(2-1)/4). Similarly, the word resemblance degree of the words whose concepts are coincident with each other by returning back to the third hierarchy of the thesaurus or to the fourth hierarchy is equal to ½, or ¾, respectively.

Now, for instance, suppose only independent words are registered in the word dictionary 6. As a result, in the recognizing unit 4, continuous speech recognition is carried out on only independent words. As a consequence, at step S1, the words "Kare (he)", "Ninchi (one's new post)", and "Omomuku (go, leave)"are combined to form an input word series ("Kare (he)", "Ninchi (one's new post)", "Omomuku (go, leave)"). Also, as an example, when consideration is made of "Watashi wa Gakko ni Iku", the word resemblance degrees between the respective words for constructing the input word series and the words of "Watashi (I)", "Gakko (school)", "Iku (go to)" corresponding to "Kare (he)", "Ninchi (one's new post)", "Omomuku (go, leave)", which constitute the example "Watashi wa Gakko ni Iku (I go to school)" are given as follows below. Now, a word resemblance degree between words X and Y is expressed as d (X, Y).

In other words, since the concept of the word "Kare (he)" is made coincident with the concept of the word "Watashi (I)", in view of the concept "Ninshou (person) ", by returning back to the second hierarchy of the thesaurus, the word resemblance degree "I'd" ("Kare (he)", "Watashi (I)") becomes ¼. Also, since the concept of the word "Ninchi (one's new post)" is coincident with the concept of the word "Gakkou (school)", in view of the concept "Shakai (society) ", by returning back to the third hierarchy of the thesaurus, the word resemblance degree "d" ("Ninchi (one's new post)" and "Gakkou (school)") becomes ½. Furthermore, since the concept of the word "Omomuku (go, leave)" is coincident with the concept of the word "Iku (go to)", in view of the concept "Ouhuku (go to and back)", by returning back to the first hierarchy, the word resemblance degree "d" ("Omomuku (go, leave)", "Iku (go to)" becomes 0.

When the above-described word resemblance degrees are accumulated, the resulting accumulated value becomes ¾ (=¼+½+0). This value is recognized as the resemblance degree between the input word series ("Kare (he))", "Ninchi (one's new post)", "Omomuku (go, leave)") and the example "Watashi wa Gakkou ni Iku (I go to school)".

The above-described calculation of the resemblance degree with respect to the input word series ("Kare (he)", "Ninchi (one's new post)", "Omomuku (go, leave)") will be executed for all of the examples registered in the example database 7.

Referring back to FIG. 3, when the calculation of the resemblance degree at step S2 is accomplished, the process operation is advanced to step S3. At step S3, a judgment is made as to whether or not the resemblance degree calculations defined at step S2 have been performed with respect to all of the word combinations obtained from the proposed word subject lattice of the recognizing unit 4. When it is judged at step S3 that the resemblance degree calculations are not yet performed with respect to all of the word combinations obtained from the proposed word subject lattice, the process operation is returned to the previous step S1, at which step a word combination (input word series) is newly formed, and then a similar process operation is repeated.

In other words, at step S1, when as the new input word series, for example, ("Kanojo (she)", "Haha (mother)", "Niteiru (look like)") is formed, similarly to the above-described case of step S2, a word degree "d" ("Kanojo (she)", "Watashi (I)" another word resemblance degree "d" ("Haha (mother)" "Gakko (school) and another word resemblance degree I'd" ("Niru (look like)", "Iku (go to)") are calculated ¼, ¾, and ¾, respectively. These word resemblance degrees "I'd" are related between the words "Kanojo (she)", "Haha (mother)" for constituting this input word series (note that the word "Niteiru" is understood as the word "Niru"), and the words "Watashi (I)", "Gakko (school) ", "Iku (go to)" corresponding to "Kanojo (she)", "Haha (mother)", "Niteiru (look like)" for constructing the above-mentioned example "Watashi wa Gakkou ni Iku (I go to school)." As a result, a resemblance degree between the input word series ("Kanojo (she)", "Haha (mother)", "Niteiru (look like)") and the example "Watashi wa Gakko ni Iku (I go to school)") is calculated as ⅞ (¼+¾+¾).

On the other hand, when it is judged at step S3 that the resemblance degree calculations have been carried out as to all of the word combinations obtained from the proposed word subject lattice, the process operation is advanced to step S4. At step S4, an example whose resemblance degree is the highest and the input word series are selected, and then the process operation is advanced to step S5. At step S5, among the words that constitute the examples selected at step S4, those words corresponding thereto which construct the input word series selected at step S4 are replaced by the words that constitute this input word series. The replacement words are outputted as a sentence/speech recognition result, and thus the process operation is complete.

Assume, for the sake of simple explanation, that only "Watashi wa Gakkou ni Iku (I go to school)" is the example stored in the example database 7, and only two sets of input word series ("Kare (he)", "Ninchi (one Is new post)", "Omomuku (go, leave)") and ("Kanojo (she)", "Haha (mother)", "Niteiru (look like)") are formed. As described above, the resemblance degree between the input word series ("Kare (he)", "Ninchi (one's new post)", "Omomuku (go, leave)") and ("Kanojo (she)", "Haha (mother)", "Niteiru (look like)"), and the example "Watashi wa Gakkou ni Iku (I go to school)", becomes ¾ and ⅞. In this embodiment, the high resemblance degree implies the small value of the resemblance degree. (This is because in FIG. 6, the lowermost conceptional hierarchy is defined as the first hierarchy, then comes the second hierarchy, etc., all of which constitute the thesaurus. Conversely, when the uppermost conceptional hierarchy is defined as the first hierarchy, and the next down is the second hierarchy, etc., all of which constitute the thesaurus, the high resemblance degree implies a large value of the resemblance degree.) As result, at step S4, the input word series ("Kare (he)", "Ninchi (one's new post)", "Omomuku (go, leave)") and the example "Watashi wa Gakko ni Iku (7 go to school)" are selected.

Then, at step S5, among the words for constructing the example "Watashi wa Gakko ni Iku (I go to school)", such words corresponding to the words that constitute the input word series ("Kare (he)", "Ninchi (one's new post)", "Omomuku (go, leave)") are replaced by the words "Kare (he)", "Ninchi (one's new post)", "Omomuku (go, leave)" that constitute this input word series. Namely, "Watashi (I)", "Gakko (school)", "Iku (go to)" corresponds to "Kare (he)", "Ninchi (one's new post)", "Omomuku (go, leave)". Then, the replaced result "Kare wa Ninchi ni Omomuku (He leaves for his new post)" is outputted as the sentence/speech recognition result.

As previously explained, according to this speech recognizing apparatus, when a plurality of input word series are outputted as the proposed speech recognition result candidates, these proposed candidates are classified by comparison to the examples. Then, the input word series which has the highest resemblance degree with respect to the example can be obtained as the speech recognition result. As a result, in order to classify a plurality of proposed speech recognition result candidates (namely, to select one speech recognition result from a plurality of proposed speech recognition results), there is no need to employ grammatical rules described by language specialists. Also, since the examples can be readily formed from newspaper descriptions and the like, it is possible to easily develop (manufacture) the speech recognizing apparatus.

Furthermore, in the case where an input speech for which no correct speech recognition result can be obtained is inputted, this input speech is merely added to the example database 7 as an example, so that recognition performance levels can be easily improved. In this case, since the examples whose resemblance degrees are calculated at step S2 are merely increased, there is no risk that, after these examples have been added, the speech which could be correctly recognized before the addition of these examples is not thereafter correctly recognized.

Also, in combination with the examples, expressions of their meanings may be registered in the example database 7, so that details concerning the meanings of inputted speech may be easily understood.

Figure 7:
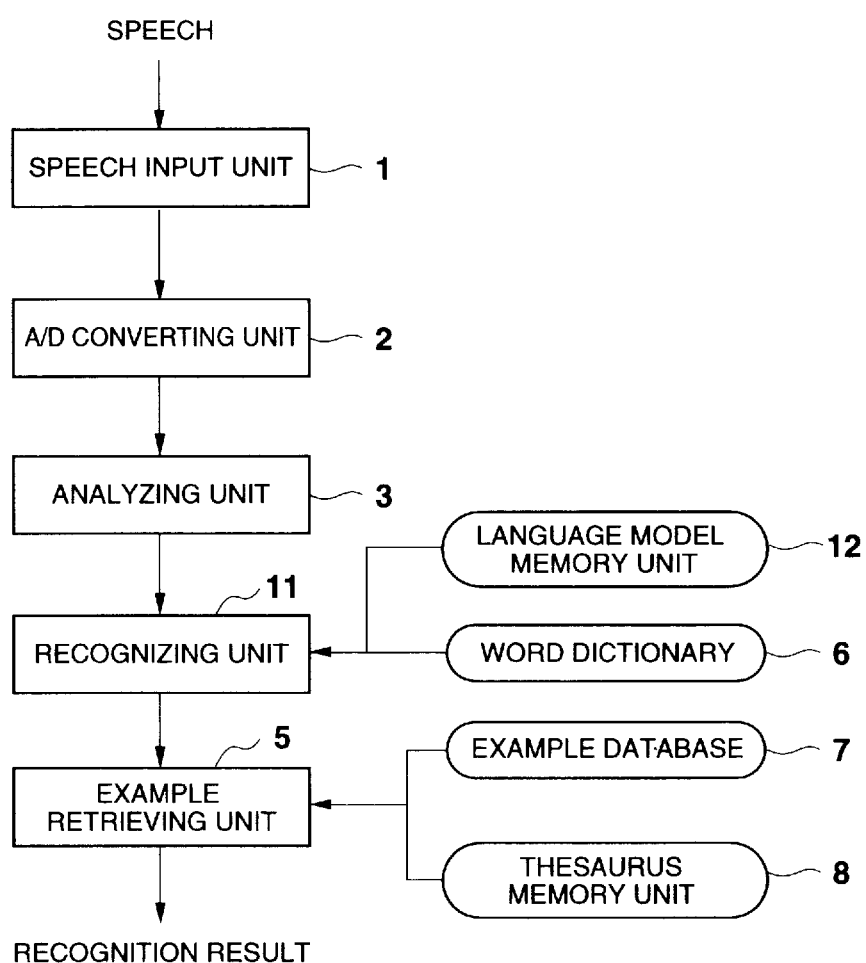
FIG. 7 is a schematic block diagram representing an arrangement of a speech recognizing apparatus according to a second embodiment of the present invention.

FIG. 7 schematically shows an arrangement of a speech recognizing apparatus according to a second embodiment of the present invention. It should be noted that the same reference numerals indicated in FIG. 2 will be employed for denoting the same or similar elements of this second embodiment. That is, this speech recognizing apparatus employs a new arrangement such that a recognizing unit 11 (recognizing means) is used instead of the recognizing unit 4, and newly employs a language model memory unit 12 (language model memory means) in addition to the remaining arrangements of the recognizing apparatus of FIG. 2.

The language model memory unit 12 stores, for example, a statistical language model such as a bigram, or a trigram. In this embodiment, a language model implies that an occurrence of probability is calculated based upon a large amount of sentence data, such as newspaper and magazine information, for which how many times chains in a certain unit happen to occur is calculated. In other words, a language model corresponds to a table for representing an occurrence of probability where a certain word may be connected to another certain word, in combination with combinations of words. A statistical unit is a phoneme, a word, a part of speech and so on. There are statistical methods, i.e., the probability that units individually occur (unigram), the probability that a specific unit occurs in a two-chain manner (bigram), and the probability that a specific unit occurs in a three-chain manner (trigram).

In FIG. 8, there is represented an example of a word-unit bigram.

Similar to, for example, the recognizing unit 4, the recognizing unit 11 performs a speech recognition process in such a manner that a loose language restriction is made based upon the language model stored in the language model memory unit 12, and a parsing processing operation is properly performed by way, for example, of a beam search using the Viterbi algorithm under this loose language restriction. Then, a plurality of proposed sentence candidates are obtained as a plurality of remaining speech recognition results. The respective proposed sentence candidates are converted into word series consisting of only independent words by deleting, for instance, a particle. The converted word series are outputted to the example retrieving unit 5.

In the example retrieving unit 5, a plurality of word series are entered, from the recognizing unit 11, as input word series, and the resemblance degrees thereof, with reference to the examples, are calculated.

As a consequence, since the restriction based on the language model is loose, it is conceivable that the proposed sentence subjects outputted from the recognizing unit 11 may contain not only grammatically correct and meaningful sentence candidates, but also erroneous sentence candidates. However, as such erroneous sentence candidates possess lower resemblance degrees in the example retrieving unit 5, these erroneous sentence candidates are not treated as final speech recognition results. In this case, since the input word series are restricted by the language models in the recognizing unit 11, the number of input word series whose resemblance degrees are calculated by the example retrieving unit 5 becomes smaller than the number in FIG. 2. As a result, the sentence recognizing process can be done at high speed.

It should be noted that the language restrictions may be made based upon not only the language models, but also, for example, by employing a finite state network.

Figure 9:
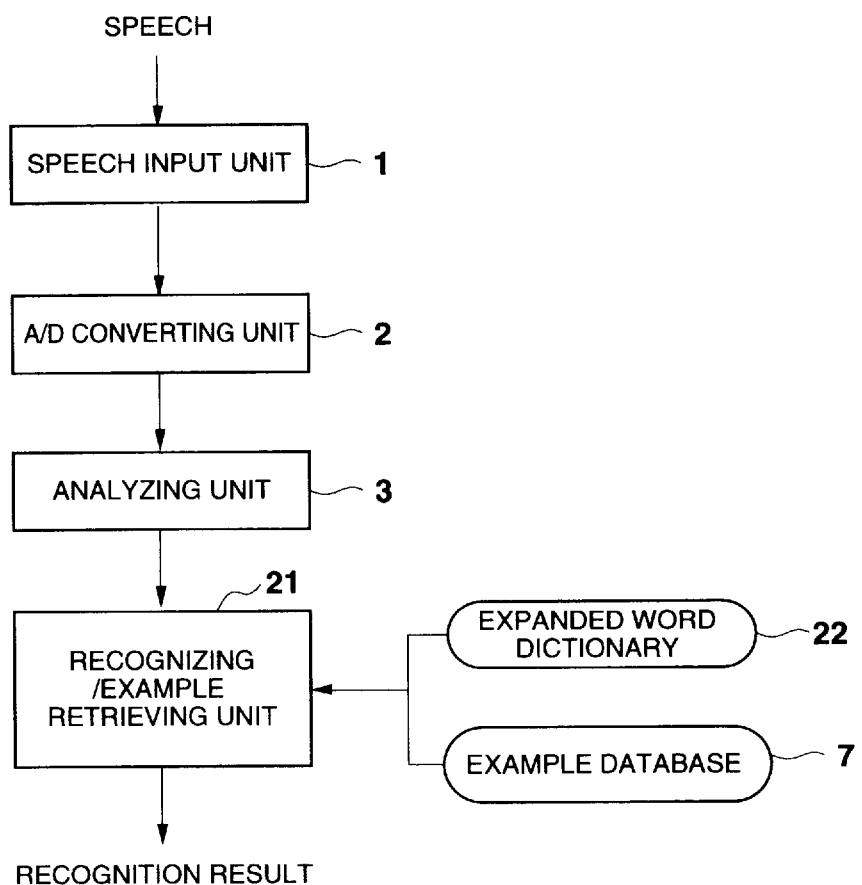
FIG. 9 is a schematic block diagram indicating an arrangement of a speech recognizing apparatus according to a third embodiment of the present invention.

FIG. 9 schematically shows an arrangement of a speech recognizing apparatus according to a third embodiment the present invention. It should be noted that the same reference numerals indicated in FIG. 2 will be employed for denoting the same or similar elements of this third embodiment. That is, this speech recognizing apparatus employs a new arrangement wherein a recognizing example retrieving unit 21, instead of the recognizing unit 4 and the example retrieving unit 5, and an expanded word dictionary 22, instead of the word dictionary 6 and the thesaurus memory unit 8, in addition to the remaining arrangements of the recognizing apparatus of FIG. 2 are employed.

The recognizing/example retrieving unit 21 is made by assembling the recognizing unit 4 with the example retrieving unit 5, and is designed in such a way that the continuous speech recognition process and the resemblance degree calculation can be performed in a parallel manner. Also, the expanded word dictionary 22 is made by assembling the thesaurus stored in the thesaurus memory unit 8 with the word dictionary 6, in which, as shown in FIG. 6, phonemic information, parts of speech, and other necessary information are stored in correspondence with the words of the thesaurus.

In the speech recognizing apparatus with the above-described arrangement, similarly to in the recognizing unit 4, speech recognition is performed in the recognizing/example retrieving unit 21 while referring to the expanded word dictionary 22. When this expanded word dictionary 22 is retrieved, not only the information required to recognize the speech (for instance, the phonemic information of words), but also other information required to calculate the resemblance degrees are read out therefrom.

As a result, when the resemblance degree is subsequently calculated, since it is no longer necessary to refer to the expanded word dictionary 22, the speech recognizing process operation can be performed at high speed. Furthermore, in this case, the memory capacity of this expanded word dictionary 22 can be reduced, as compared with the memory capacities required when either the word dictionary 6 or the thesaurus memory unit 8 is independently realized.

Figure 10:
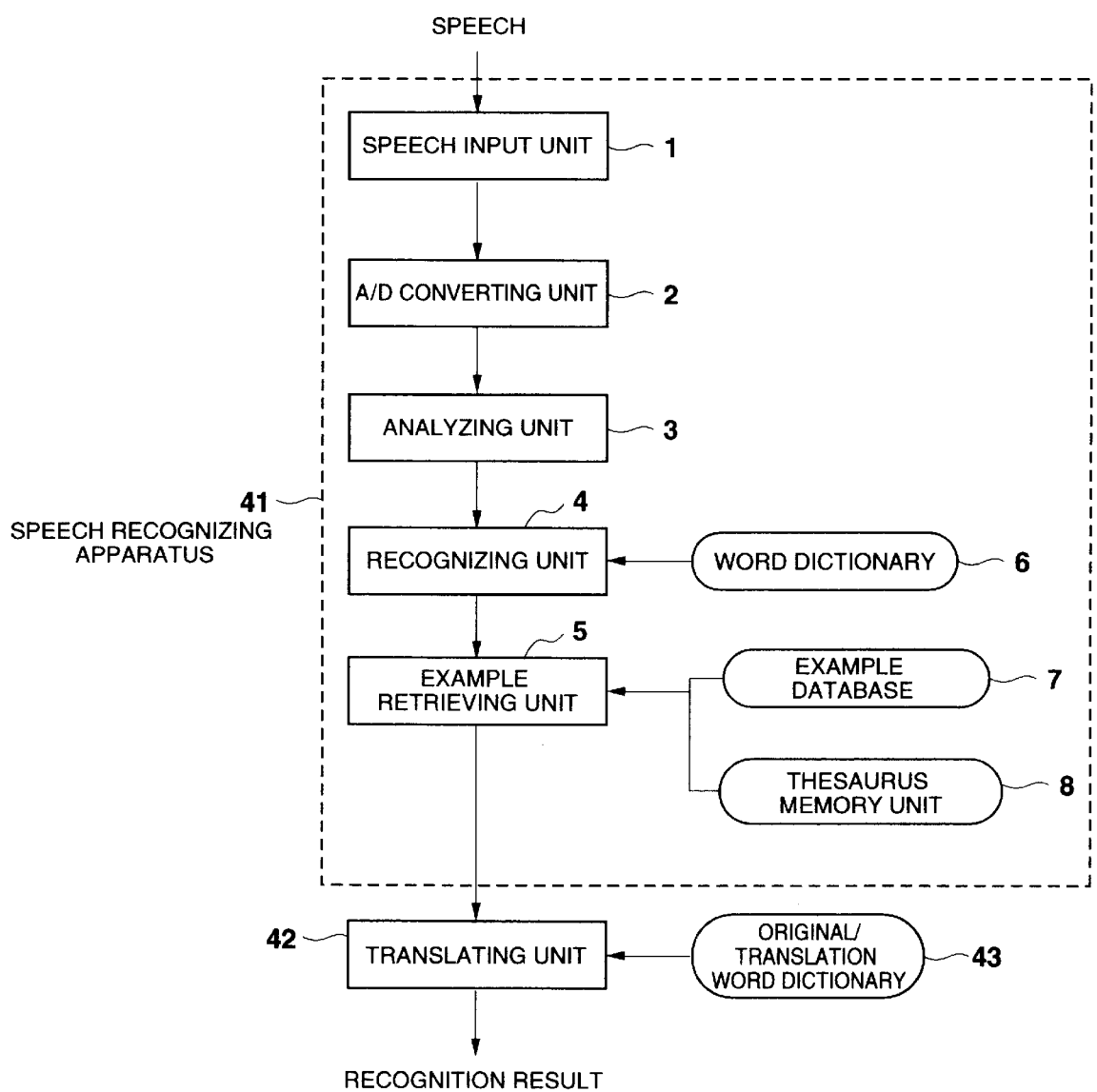
FIG. 10 is a schematic block diagram representing an arrangement of a speech translating apparatus according to a first embodiment of the present invention.

Next, FIG. 10 shows an arrangement of a speech translating apparatus according to an embodiment of the present invention. This speech translating apparatus comprises a speech recognizing apparatus 41, a translating unit 42, and an original/translated word dictionary 43. The speech recognizing apparatus 41 is arranged in a similar manner to that of the speech recognizing apparatus shown in FIG. 2. The translating unit 42 (translating means) may translate a language outputted from the speech recognizing apparatus 41 into another language while referring to the original/translated word dictionary 43. The original/translated word dictionary 43 stores therein, for instance, a Japanese word and an English word (otherwise, an English word series) which is the translation of the Japanese word.

It should be understood that the memory contents of the word dictionary 6, the example database 7, and the thesaurus memory unit 8, which constitute the speech recognizing apparatus 41, pertain to, for example, Japanese. However, the example database 7 stores therein the Japanese examples, and also the examples translated into English in relation to their corresponding Japanese examples.

Referring now to FIG. 11A to FIG. 11E, the operations of this speech translating apparatus will be explained. When Japanese speech is inputted into the speech translating apparatus, a similar speech recognizing process operation is carried out as in FIG. 2 by the speech recognizing apparatus 41. As a consequence, in the example retrieving unit 5, both an input word series and an example whose resemblance degrees are the highest are obtained. Then, the resultant input word series and example are outputted to the translating unit 42.

Assuming now that an input word series whose resemblance degree has the highest value, and an example thereof, are ("Watashi", "Gakkou", "Iku") and "Watashi wa Tera ni Iku", respectively, the input word series ("Watashi", "Gakkou", "Iku") and "Watashi wa Tera ni Iku" are outputted to the translating unit 42 in combination with an example written into English corresponding to the first-mentioned example. It should be noted, as illustrated in FIG. 11A, that the Japanese example "Watashi wa Tera ni Iku" and the English example "I go to the temple" are defined in such a manner that the structural words correspond to each other, i.e., ("Watashi" ("Tera" "temple"), ("Iku"="go").

In the translating unit 42, the words "Watashi", "Tera", "Iku" corresponding to the input word series among the words for constructing the Japanese example "Watashi wa Tera ni Iku" are as shown in FIG. 11B replaced by the words "Watashi", "Gakkou", "Iku" for constructing the input word series. As a result, the Japanese example "Watashi wa Tera ni Iku" is converted into the Japanese example "Watashi wa Gakkou ni Iku". Accordingly, this Japanese example "Watashi wa Gakkou ni Iku" is made in correspondence with the English example "I go to the temple" corresponding to the Japanese example "Watashi wa Tera ni Iku", as illustrated in FIG. 11C.

Thereafter, the translating unit 42 converts the words for constituting the input word series into English words or an English word series with reference to the original/translated word dictionary 43. In other words, as represented in FIG. 11D, in this case, the words "Watashi", "Gakkou", "Iku" that constitute the input word series are translated into the words "I", "school", "go to", respectively.

Then, as shown in FIG. 11E, the translating unit 42 replaces "I" corresponding to "Watashi", "the temple" corresponding to "Gakkou", "go to" corresponding to "Iku" (see FIG. 11C) by "I" corresponding to "Watashi", "school" corresponding to "Gakkou", "go to" corresponding to "Iku" (see FIG. 11D). As a result, the obtained English sentence "I go to school" is outputted. This translation result is represented on a display or the like, or is inputted into a speech synthesizing apparatus to be outputted as a synthesized sound.

In the conventional speech translating apparatus, when one sentence is outputted as a speech recognition result, this outputted sentence is translated by way of machine translation. A major method of conventional machine translation is performed as follows: First an entered sentence is converted into an intermediate language, and then the meaning of the inputted sentence is understood based upon this intermediate language. Thereafter, it is converted into the objective language. However, recently, a method for conducting the translating process based upon the following example has been studied for possible usage. In other words, according to this method, an example resembling an inputted text is retrieved. The words that constitute the resulting example are replaced by the words of the objective language based on the original/translated word dictionary of the two languages (namely, the language of the input text and the translated language). As a consequence, the translated result can be obtained. According to this conventional method, there is no need to convert the input sentence into an intermediate language.

To the contrary, since the speech translating apparatus of FIG. 10 conducts the processing operation based on an example made during speech recognition, the example utilized in this speech recognition can be directly used in the translation. As a result, in accordance with the speech translating apparatus shown in FIG. 10, the translation process can be simplified and also performed at a high speed, compared with a speech translating apparatus wherein the speech recognizing apparatus and the machine translating apparatus are separately constructed and connected to each other.

While the various preferred embodiments of the present invention have been explained, the present invention is not limited to the above-explained embodiments, but may be applied to, for instance, an apparatus capable of processing inputted speech.

In the above-described embodiment, the resemblance degrees of the words are directly accumulated, and the accumulated result is employed as the resemblance degree. Alternatively, the desirable resemblance degree may be obtained in such a manner that, for instance, the word resemblance degree is weighted in correspondence with the structure of the thesaurus, and the weighted word resemblance degree is accumulated.

Although the thesaurus is utilized so as to calculate the resemblance degree in the above-described embodiment, the method for calculating the resemblance degree is not limited thereto.

Moreover, in the speech translating apparatus of FIG. 10, the speech translation has been carried out from Japanese into English. Alternatively, for example, a language other than Japanese may be translated into English, or Japanese may be translated into a language other than English by changing the registered contents of the word dictionary 6, the example database 7, the thesaurus memory unit 8 and the original/translated word dictionary 43.

Also, the speech translating apparatus shown in FIG. 10 is equipped with a speech recognizing apparatus which is constituted similar to the speech recognizing apparatus of FIG. 2. Alternatively, speech recognizing apparatus 41 may be arranged similar to such speech recognizing apparatuses as indicated in FIG. 7 and FIG. 9.

In accordance with the speech recognizing apparatus and the speech recognizing method of the present invention, the resemblance degree between each of the plurality of proposed recognition results and each of the examples is calculated, and then the desirable speech recognition result can be obtained based upon this calculated resemblance degree. As a result, a plurality of proposed recognition result candidates are categorized without employing grammatical rules, so that a desirable recognition result can be obtained.

Also, in accordance with the speech translating apparatus of the present invention, calculation is made between each of the plural proposed recognition result candidates and each of the examples, and then the speech recognition result is obtained based on this calculated resemblance degree. Then, the language of this speech recognition result is translated into another language. As a consequence, speech entered as voice can be easily translated.

What is claimed is:

1. A speech recognizing apparatus for performing sentence/speech recognition, comprising:

extracting means for acoustically analyzing speech inputted therein to extract a feature parameter of said inputted speech;

recognizing means for recognizing said inputted speech based upon said feature parameter outputted from said extracting means to thereby obtain a plurality of proposed recognition result candidates;

example memory means for storing therein a plurality of examples; and calculation means for calculating a resemblance degree between each of said plurality of proposed recognition result candidates and each of the plural examples stored in said example memory means and for obtaining said speech recognition result based on said calculated resemblance degree.

2. A speech recognizing apparatus as claimed in claim 1 wherein:
  said recognizing means recognizes said input speech in word units.

3. A speech recognizing apparatus as claimed in claim 2, further comprising:
  word concept memory means for storing therein words by categorizing said words; wherein
    each proposed recognition result candidate is made by combining more than one word; and
    said calculating means calculates a word resemblance degree indicative of a conceptional resemblance characteristic between each of said words for constituting said proposed recognition result candidates and each of the words for constituting said examples with reference to said word concept memory means, and calculates said resemblance degree based on said calculated word resemblance degree.

4. A speech recognizing apparatus as claimed in claim 3, wherein:
  said word concept memory means stores therein the words in a hierarchical tree structure based on the concept thereof.

5. A speech recognizing apparatus as claimed in claim 3, further comprising:
  word memory means for storing therein at least the word to be recognized by said recognizing means, phonemic information about said word, and speech part information about said word; wherein
    said word concept memory means and said word memory means are made in an integral form.

6. A speech recognizing apparatus as claimed in claim 1, further comprising:
  language model memory means for storing therein a language model classified according to the probability of connections among a plurality of words; wherein
    said recognizing means performs said speech recognition under restrictions of said language model stored in said language model storing means so as to obtain a plurality of proposed recognition result candidates.

7. A speech recognizing method for performing sentence/speech recognition, comprising the steps of:
  acoustically analyzing input speech to extract a feature parameter of said input speech;
  recognizing said input speech based upon said extracted feature parameter so as to obtain a plurality of proposed recognition result candidates; and
  calculating a resemblance degree between each of said plurality of proposed recognition result candidates and each of plural examples stored in example memory means and then obtaining said speech recognition result based upon said calculated resemblance degree.

8. A speech translating apparatus for translating a language of inputted speech into another language, comprising:

extracting means for acoustically analyzing speech inputted therein to extract a feature parameter of said inputted speech;
recognizing means for recognizing said inputted speech based upon said feature parameter outputted from said extracting means to thereby obtain a plurality of proposed recognition result candidates;
example memory means for storing therein a plurality of examples;
calculation means for calculating a resemblance degree between each of said plurality of proposed recognition result candidates and each of the plural examples stored in said example memory means and for obtaining said speech recognition result based on said calculated resemblance degree, and
translating means for translating the language of said speech recognition result outputted from said calculation means into said another language.

9. A speech translating apparatus as claimed in claim 8 wherein
  said recognizing means recognizes said input speech in word units.

10. A speech translating apparatus as claimed in claim 8, further comprising:
  word concept memory means for storing therein words by categorizing said words; wherein
    each proposed recognition result candidate is made by combining more than one word; and
    said calculating means calculates a word resemblance degree indicative of a conceptional resemblance characteristic between each of said words for constituting said proposed recognition result candidates and each of the words for constituting said examples with reference to said word conceptional memory means, and calculates said resemblance degree based on said calculated word resemblance degree.

11. A speech translating apparatus as claimed in claim 10, wherein
  said word concept memory means stores therein the words in a hierarchical tree structure based on the concept thereof.

12. A speech translating apparatus as claimed in claim 10, further comprising:
  word memory means for storing therein at least the word to be recognized by said recognizing means, phonemic information about said word, and part of speech information about said word; wherein
    said word concept memory means and said word memory means are made in an integral form.

13. A speech translating apparatus as claimed in claim 8, further comprising:
  language model memory means for storing therein a language model classified according to the probability of connections among a plurality of words; wherein:
    said recognizing means performs said speech recognition under restriction of said language model stored in said language model storing means so as to obtain a plurality of proposed recognition result candidates.

* * * * *